United States Patent [19]

Kuriki

[11] Patent Number: 5,181,562
[45] Date of Patent: Jan. 26, 1993

[54] HEAT EXCHANGER ELEMENT AND METHOD OF MAKING THE SAME

[75] Inventor: Hideaki Kuriki, Nagoya, Japan

[73] Assignee: Kabushiki Kaisha Toshiba, Kanagawa, Japan

[21] Appl. No.: 849,957

[22] Filed: Mar. 12, 1992

[30] Foreign Application Priority Data

Mar. 15, 1991 [JP] Japan .................................. 3-76937

[51] Int. Cl.$^5$ ............................................. F28F 3/08
[52] U.S. Cl. ................................ 165/166; 165/905; 428/294; 156/62.2; 156/292; 156/177
[58] Field of Search .............. 165/166, 170, 905; 156/62.2, 62.8, 290, 292, 177, 179; 428/294, 296

[56] References Cited

U.S. PATENT DOCUMENTS

| | | | |
|---|---|---|---|
| 3,428,141 | 2/1969 | Forstner et al. | 165/166 X |
| 3,613,258 | 10/1971 | Jamieson | 428/296 X |
| 3,867,245 | 2/1975 | Herman | 161/143 |
| 4,110,505 | 8/1978 | Prewo | 428/114 |
| 4,858,685 | 8/1989 | Szücs et al. | 165/166 |
| 4,874,042 | 10/1989 | Becker | 165/166 |
| 4,944,995 | 7/1990 | Owens | 428/294 |

FOREIGN PATENT DOCUMENTS

| | | |
|---|---|---|
| 1127924 | 4/1962 | Fed. Rep. of Germany ...... 165/170 |
| 62-29898 | 2/1987 | Japan . |

Primary Examiner—Allen J. Flanigan
Attorney, Agent, or Firm—Limbach & Limbach

[57] ABSTRACT

A heat exchange element employed in heat exchangers of air conditioning system includes a heat exchanging sheet member containing heat meltable synthetic resin fibers and a plurality of elongate rollable shaped spacers. The heat exchanging sheet member has one side on which the spacers are bonded by a heat meltable layer of the synthetic resin fibers contained in the heat exchanging sheet member so that each spacer is spaced from the adjacent spacer on the heat exchanging sheet member. A method of making the heat exchange element includes steps of rolling a plurality of elongate rollable spacers on a base having in an upper face a plurality of spaced grooves so that the spacers are positioned in the respective grooves, unrolling a rolled heat exchanging sheet member containing synthetic resin fibers and placing the unrolled portion of the sheet member over the base, heating an upper side of the sheet member over the base by heaters so that the synthetic resin fibers contained in the sheet member are melted and bonding the spacers to a lower side of the sheet member by a heat melted layer of the synthetic resin fibers, and cutting the sheet member with the spacers bonded to it so as to have predetermined dimensions.

2 Claims, 5 Drawing Sheets

HEAT EXCHANGER ELEMENT AND METHOD OF MAKING THE SAME

BACKGROUND OF THE INVENTION

This invention relates to a heat exchange element employed in a heat exchanger incorporated in an air conditioning system and a method of making such a heat exchange element.

Conventionally, a so-called corrugated board type heat exchanger has been generally employed in an air conditioning system or the like. Referring to FIGS. 5 and 6, generally rectangular heat exchanging paper sheets 1 and corrugated partitions 2 formed, for example, of a special kraft paper containing calcium chloride are alternately stacked on each other. The directions of the partitions 2 are alternately changed by 90 degrees such that two perpendicular air flow passages 3 are provided. Heat exchange is performed between air flows passing through the air flow passages 3.

In the above-described conventional construction, however, the paper sheets 1 and corrugated partitions 2 are alternately stacked on each other so that each partition 2 is provided over an entire width of each paper sheet 1 at an entrance of each air flow passage 3. Furthermore, a large number of narrow passage portions are formed between the partitions 2 and the paper sheets 1 in the above-described construction. Consequently, resistance of each air flow passage is increased, resulting large air flow pressure loss.

In order to overcome the above-described disadvantage, the construction illustrated in FIGS. 7 and 8 has been proposed. Referring to FIGS. 7 and 8, a heat exchange element 7 comprises a paper sheet 5 and a plurality of partition pieces 6 formed from a synthetic resin. The partition pieces 6 are vertically mounted on one side of the paper sheet 5. A large number of such heat exchange elements 7 are stacked so that the direction of the partition pieces 6 of each heat exchange element 7 are alternately changed by 90 degrees. In this construction, each air flow passage 8 has a rectangular cross section, which can reduce the air flow pressure loss as compared with the above-described conventional construction. However, producing the above-described heat exchange element 7 necessitates a special forming step in which the synthetic resin partition pieces 6 are formed integrally with the paper sheet 5. This special forming step necessitates special production equipment and forming dies, resulting in a considerable increase in the production cost of the heat exchange element.

SUMMARY OF THE INVENTION

Therefore, an object of the present invention is to provide a heat exchange element which can be readily produced with the production cost increase restrained and wherein the pressure loss of a fluid flowing through flow passages can be reduced and a method of making such a heat exchange element.

The present invention provides a heat exchange element comprising a heat exchanging sheet member containing heat meltable synthetic resin fibers and a plurality of elongate rollable shaped spacers, the heat exchanging sheet member having one side on which the spacers are bonded by a heat meltable layer of the synthetic resin fibers contained in the heat exchanging sheet member so that each spacer is spaced from the adjacent spacer on the heat exchanging sheet member.

The present invention also provides a method of making a heat exchange element, comprising steps of rolling a plurality of elongate rollable shaped spacers on a base having in an upper face a plurality of spaced grooves so that the spacers are positioned in the respective grooves, unrolling a rolled heat exchanging sheet member containing synthetic resin fibers and placing the unrolled portion of the sheet member over the base, heating an upper side of the sheet member over the base by a plurality of heaters so that the synthetic resin fibers contained in the sheet member are melted and bonding the spacers to a lower side of the sheet member by a melted layer of the synthetic resin fibers contained in the sheet member, and cutting the sheet member with the spacers bonded thereto so as to have predetermined dimensions.

In accordance with the present invention, air flow passages are formed by providing a plurality of spacers on one side of the heat exchanging sheet member so that the spacers are spaced. Consequently, the pressure loss of the fluid flowing through the passages can be reduced as compared with the conventional heat exchange element wherein the corrugated partitions are employed.

Furthermore, since the spacers are bonded to the side of the heat exchanging sheet member, the heat exchange element can be readily produced with an cost-effective production equipment.

It is preferable that each spacer be formed from the same kind of synthetic resin as composing the synthetic resin fibers contained in the heat exchanging sheet member. Consequently, the spacers can be desirably bonded to the heat exchanging sheet member.

Furthermore, it is preferable that the sheet member be unrolled in the direction of elongation of the spacers. Consequently, the bending of the sheet member can be straightened by the spacers.

Additionally, it is preferable that each heater include a generally straight heating face brought into contact with and heating the sheet member and each heater is set so that the straight heating face thereof intersects the spacers.

Other objects of the present invention will become obvious upon understanding of the illustrative embodiment about to be described. Various advantages not referred to herein will occur to one skilled in the art upon employment of the invention in practice.

BRIEF DESCRIPTION OF THE DRAWINGS

The embodiment of the invention will be described with reference to the accompanying drawings in which.

DESCRIPTION OF THE PREFERRED EMBODIMENT

Figure 1:
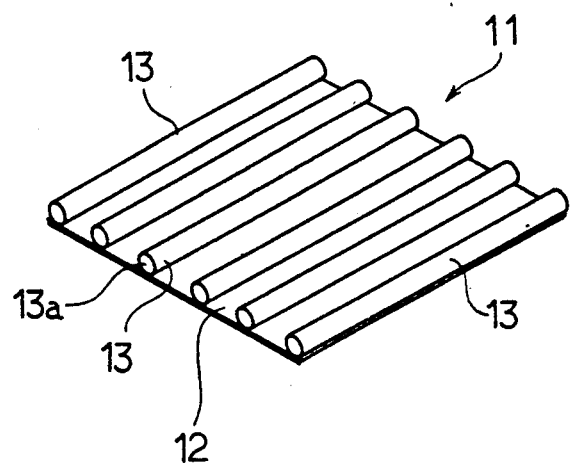
FIG. 1 is a perspective view of a heat exchange element of one embodiment in accordance with the invention.
Figure 2:
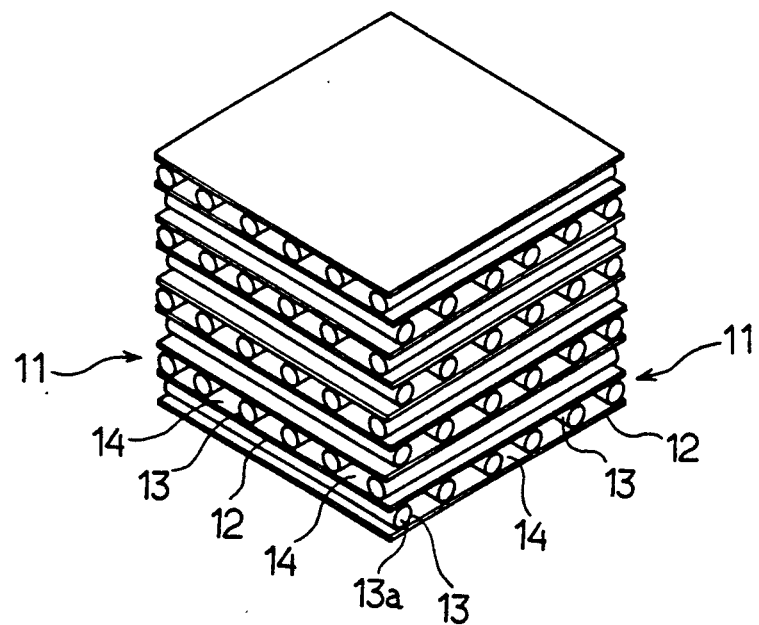
FIG. 2 is a perspective view of the heat exchange elements stacked one upon another.

One embodiment of the present invention will now be described with reference to FIGS. 1 through 4. FIG. 1 illustrates a heat exchange element 11 in accordance with the present invention. The heat exchange element 11 comprises a generally rectangular heat exchanging sheet member 12. A plurality of elongate cylindrical or tubular spacers 13 are bonded on one side of the heat exchanging sheet member 12 so as to be spaced on the sheet member. In the embodiment, six such spacers 13 are bonded on the sheet member 12.

The heat exchanging sheet member 12 is formed of a sheet of paper containing synthetic resin fibers. In the embodiment, the paper contains 65 to 70% fibers comprised of polypropylene. This paper is well known and has recently been used as a paper for Japanese shoji screens or paper sliding doors used in Japanese houses.

Commercially available polypropylene straws used for sucking beverages are employed as the spacers 13. The spacers 13 are bonded on the heat exchanging sheet member 12 by a heat meltable layer of the polypropylene fibers contained in the heat exchanging sheet member 12, as will be described in detail later.

A number of the above-described heat exchange elements 11 are stacked one upon another so that the direction of elongation of the spacers 13 of each heat exchange element 11 is shifted by 90 degrees, thereby forming a crossflow heat exchanger having two perpendicular air flow passages 14.

An apparatus for and a method of making the abovedescribed heat exchange element 11 will now be described with reference to FIGS. 3 and 4. The apparatus comprises a base 15 having one end at which it is connected to a stationary member 16 via a shaft 17 for rotatable movement. The base 15 has a distal end at which it is moved upwards and downwards by a hydraulic system 18 comprising a hydraulic cylinder. The base 15 has in its upper side six generally V-shaped spaced grooves 19. The spacers 13 are to be positioned in the respective grooves 19, as will be described later. A hopper 20 is provided over the stationary member 16 for accommodating a number of spacers 13. A feeder disposed below the hopper 20 comprises a solenoid 21 and a guide passage 22. A predetermined number of the spacers 20 accommodated in the hopper 20 are fed to the base 15 side by the feeder 23.

Figure 3:
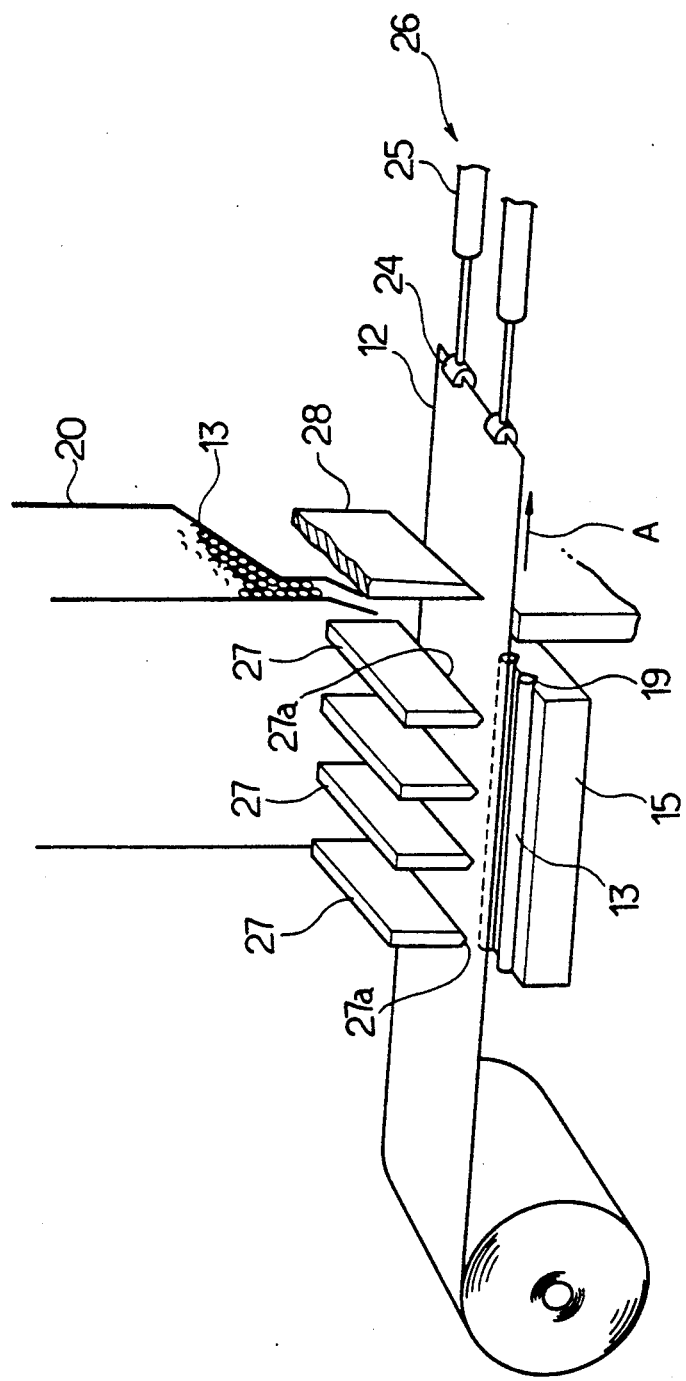
FIG. 3 is a schematic perspective view of an apparatus for producing the heat exchange element shown in FIG. 1.
Figure 4:
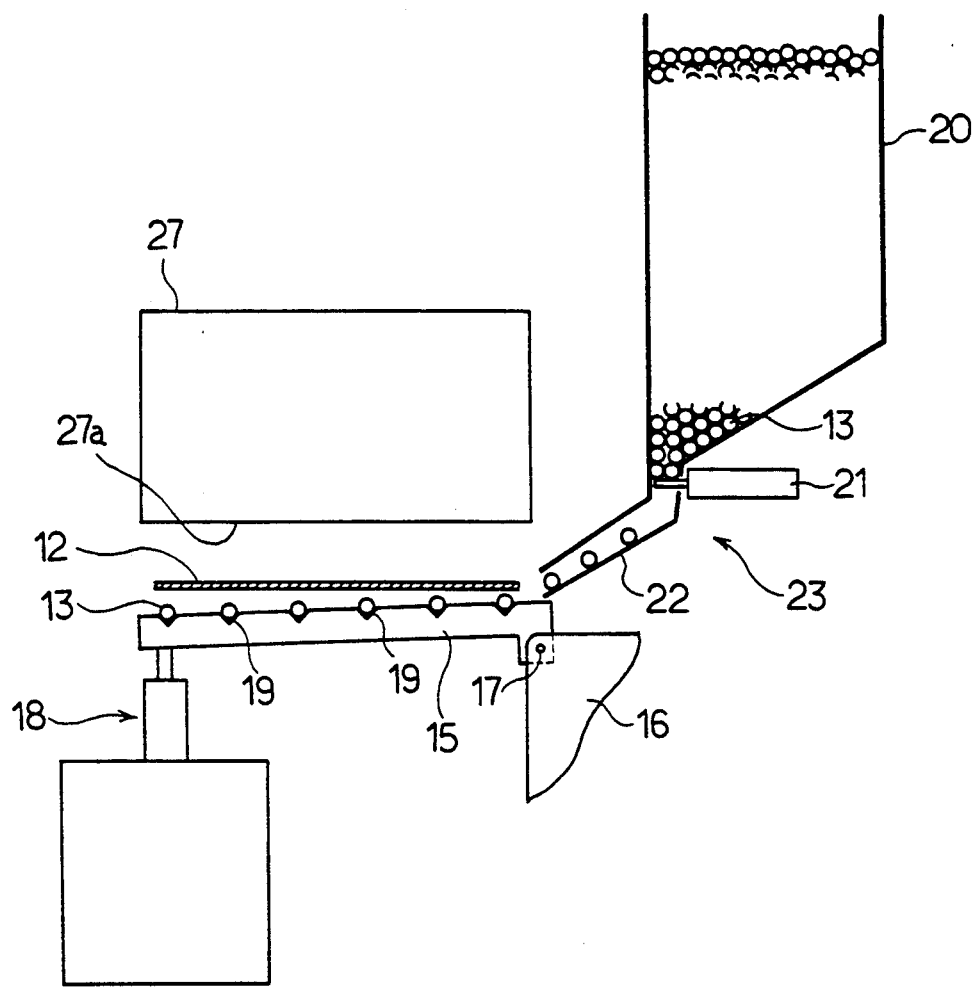
FIG. 4 is a schematic longitudinal side view of the apparatus.
Figure 5:
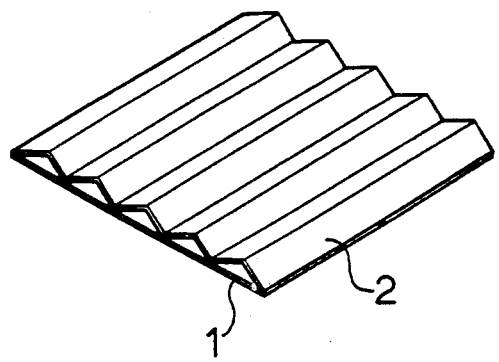
FIG. 5 is a view similar to FIG. 1 showing the construction of a conventional heat exchange element.
Figure 6:
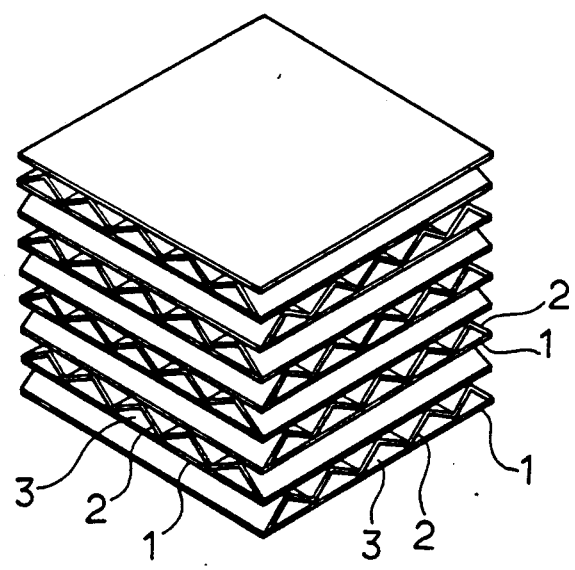
FIG. 6 is a view similar to FIG. 2 showing the conventional heat exchange element.
Figure 7:
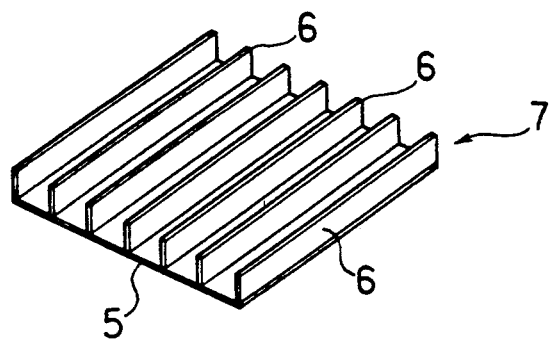
FIG. 7 is a view similar to FIG. 1 showing the construction of another conventional heat exchange element.
Figure 8:
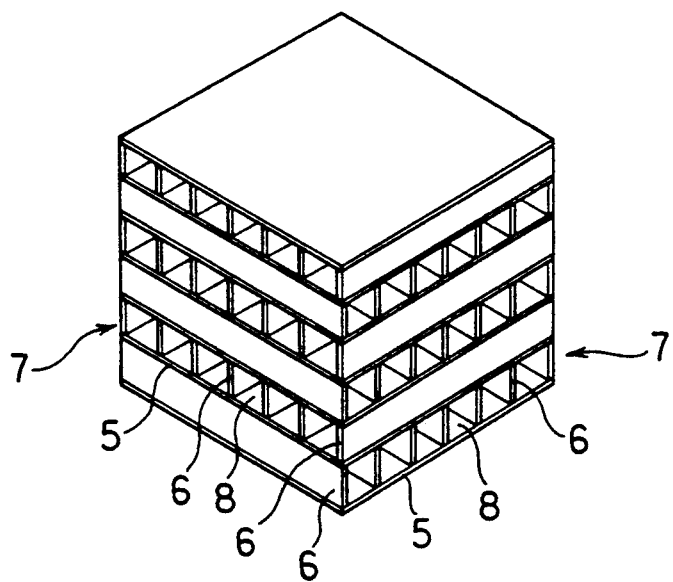
FIG. 8 is a view similar to FIG. 2 showing the another conventional heat exchange element.

A roll of heat exchanging sheet member 12 is provided at the left hand side of the base 15 as viewed in FIG. 3. The heat exchanging sheet member 12 is drawn out by a drawing apparatus 26 comprising two chucks 24 by which a distal end of the heat exchanging sheet member 12 is grasped and pneumatic or hydraulic cylinder means 25 for moving the chucks grasping the distal end of the heat exchanging sheet member 12. Thus, a predetermined length of the heat exchanging sheet member 12 is drawn by the drawing apparatus 26. In this regard the heat exchanging sheet 12 is drawn out in the direction of arrow A or in the direction of elongation of the grooves 19 of the base 15 or the spacers 13.

A plurality of flat plate-shaped heaters 27 are provided over the base 15 for vertical movement. Each heater 27 has a lower end straight heating face 27a which is longitudinally perpendicular to the direction of elongation of the grooves 19 or the spacers 13. A cutter 28 is provided at the right-hand side of the base 15 for cutting the heat exchanging sheet member 12 by a predetermined length, as viewed in FIG. 3.

In making the heat exchange element 11 by the above-described apparatus, the heat exchanging sheet member 12 is drawn out by the drawing apparatus 26 and is placed over the base 15. The distal end of the base 15 is lowered by the hydraulic system 18 so that the base 15 is inclined. When the spacers 13 are fed to the base 15 side by the feeder 23 with the base 15 inclined, the fed spacers 13 roll on the base 15 to get into the respective grooves 19. The distal end of the base 15 is raised by the hydraulic system 18 so that the base 15 becomes horizontal when the spacers 13 are thus set in the respective grooves 19. The heaters 27 each heated up to several hundred degrees Celsius are lowered in this condition so that the heating faces 27a are impressed onto the upper side of the heat exchanging sheet member 12 for several seconds. The heat exchanging sheet member 12 is thus heated such that the polypropylene fibers contained in the sheet are melted by the applied heat. The spacers 13 are bonded to the lower side of the heat exchanging sheet member 12 by a heat melted layer. In this regard each spacers 13 is spot-bonded at the points of intersection with the heating faces 27a of the heaters 27 since each spacer 13 intersects the heaters 27.

Subsequently, the sheet member 12 on which the spacers 13 are bonded is cut by the cutter 28 into pieces with a predetermined length, thereby making the heat exchange element 11 as shown in FIG. 1.

In accordance with the heat exchange element, a plurality of spacers 13 are bonded on one side of the sheet member 1 2 so as t o be s paced from o ne another. Consequently, the flow resistance of each air flow passage can be reduced in the above-described heat exchange element as compared with the conventional one that includes the corrugated partitions, thereby reducing the pressure loss of the air flow in each air flow passage 14.

' Since the straws are employed as the spacers 13, the interior 13a of each straw acts as a air flow passage, resulting in further reduction in the pressure loss. Furthermore, since each spacer 13 has the weight smaller than each conventional corrugated partition, the heat exchange element 11 and accordingly, the heat exchanger can be light-weighted. Furthermore, each spacer 13 has elasticity. Accordingly, when a number of the above-described heat exchange elements 11 are stacked one upon another to form a heat exchanger, the spacers 13 of each heat exchange element 11 can be closely contact with the sheet member 12 of the adjacent element 11, thereby preventing air leakage between the spacers 13 and the adjacent sheet member 12.

The heat exchange element 11 is formed by bonding a plurality of spacers 13 to one side of the sheet member 12. This method of forming the element 11 does not necessitate expensive forming machine, forming dies and the like which have been required in the conventional method wherein the synthetic resin partition pieces are formed integrally with the paper sheet. Thus, the heat exchange element 11 can be readily made with an inexpensive installation.

Each spacer 13 is formed from the same kind of synthetic resin as composing the synthetic resin fibers contained in the heat exchanging sheet member 12. Consequently, the spacers 13 can be reliably bonded to the heat exchanging sheet member 12. Furthermore, since each spacer 13 has a circular section allowing it to roll but, at the same time, has the elasticity, a sufficient bonding area can be ensured in each spacer 13, resulting in further reliability in bonding.

The rolled sheet member 12 is unrolled in the direction of elongation of the spacers 13. Consequently, the bending of the sheet member 12 can be straightened by the spacers 13.

Although the straws have been employed as the spacers 13 in the foregoing embodiment, slender bar-shaped bamboo members with a generally circular section or so-called bamboo skewers commercially sold in Japan may be employed for that purpose. In the case of the bamboo skewers, they can be disposed of as a flammable waste since they do not exhale noxious gas when the heat exchanger is discarded. Furthermore, the sectional configuration of the spacer 13 is not limited to the above-described one. It may be polygonal even if the spacer 13 is rollable.

The foregoing disclosure and drawings are merely illustrative of the principles of the present invention and are not to be interpreted in a limiting sense. The only limitation is to be determined from the scope of the appended claims.

I claim:

1. A heat exchange element comprising a heat exchanging sheet member containing heat meltable synthetic resin fibers and a plurality of elongate rollable shaped spacers, the heat exchanging sheet member having one side on which the spacers are bonded by a heat meltable layer of the synthetic resin fibers contained in the heat exchanging sheet member so that each spacer is spaced from the adjacent spacer on the heat exchanging sheet member.

2. A heat exchange element according to claim 1, wherein each spacer is formed from the same kind of synthetic resin as composing the synthetic resin fibers contained in the heat exchanging sheet member.

* * * * *